(12) United States Patent
Cragg

(10) Patent No.: US 8,807,666 B2
(45) Date of Patent: Aug. 19, 2014

(54) WHEEL CONSTRUCTION

(75) Inventor: Stephen R. Cragg, Telford (GB)

(73) Assignee: GKN Land Systems Limited

( * ) Notice: Subject to any disclaimer, the term of this patent is extended or adjusted under 35 U.S.C. 154(b) by 271 days.

(21) Appl. No.: 13/132,168

(22) PCT Filed: Dec. 1, 2009

(86) PCT No.: PCT/GB2009/051624
§ 371 (c)(1),
(2), (4) Date: Aug. 24, 2011

(87) PCT Pub. No.: WO2010/064032
PCT Pub. Date: Jun. 10, 2010

(65) Prior Publication Data
US 2011/0298271 A1    Dec. 8, 2011

(30) Foreign Application Priority Data
Dec. 2, 2008 (EP) .................................... 08170498

(51) Int. Cl.
*B60B 21/02* (2006.01)
(52) U.S. Cl.
USPC .................................................. 301/95.101
(58) Field of Classification Search
USPC ............ 301/95.101; 152/381.3, 379.3, 379.4, 152/379.5, 381.5
See application file for complete search history.

(56) References Cited

U.S. PATENT DOCUMENTS

| | | | | |
|---|---|---|---|---|
| 4,321,857 A | * | 3/1982 | Best ................................ | 99/340 |
| 4,351,382 A | * | 9/1982 | Corner et al. ................. | 152/516 |
| 5,318,088 A | * | 6/1994 | Billieres .................... | 152/379.3 |

FOREIGN PATENT DOCUMENTS

| | | |
|---|---|---|
| EP | 0 540 492 A1 | 5/1993 |
| GB | 1 511 151 A | 5/1978 |
| GB | 2 117 332 A | 10/1983 |
| WO | WO-2007/042813 A1 | 4/2007 |

OTHER PUBLICATIONS

International Search Report for PCT/GB2009/051624, mailed Feb. 17, 2010.

* cited by examiner

*Primary Examiner* — S. Joseph Morano
*Assistant Examiner* — Jean Charleston

(57) ABSTRACT

A wheel construction (10) includes a wheel rim (11) which in use, at a tire side (12) of the rim (11), receives a tire (14), the rim (11) being circular and having axially inner and outer portions (16,15), and a mid-portion (18) between the axially inner and outer portions (16,15), the mid-portion (18) including a circumferential well where the radius of the wheel rim (11) is a minimum, and each axially inner and outer portion (16,15) providing a flange (22), a connecting surface (23) adjoining the flange (22) and extending axially towards the mid portion (18), the flange (22) and a part of the connecting surface (23) providing a seat for a bead of the tire (14), and there being a side part (19,20) between the connecting surface (23) and the mid portion (18) and wherein for at least one of the inner and outer portions (16, 15), the connecting surface (23) is frusto-conical having an axial end (24) of greatest radius and an axial end (25) of least radius, the connecting surface (23), at its axial end (24) of greatest radius, adjoining the flange (22), and the side part (20, 19) of the at least one of the axially inner and outer portions (16, 15) including a generally frusto-conical region (28) and a curved region (40), the frusto-conical region (28) at its end of greatest radius (26) adjoining the connecting surface (23), and the curved region (40) including first (41), second (42) and third (43) axially spaced circumferentially extending concave surfaces, when viewed from the tire side (12) of the rim (11), the curved region (40) adjoining an end (29) of least radius of the frusto-conical region (28) and the mid-portion (18).

16 Claims, 2 Drawing Sheets

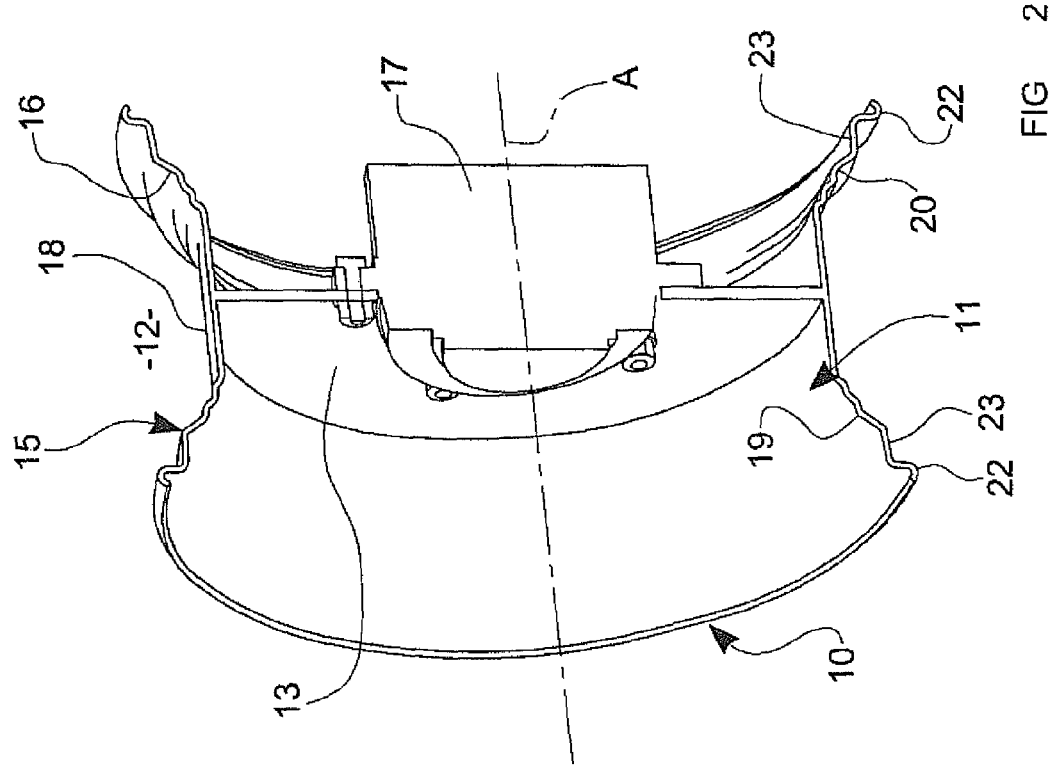
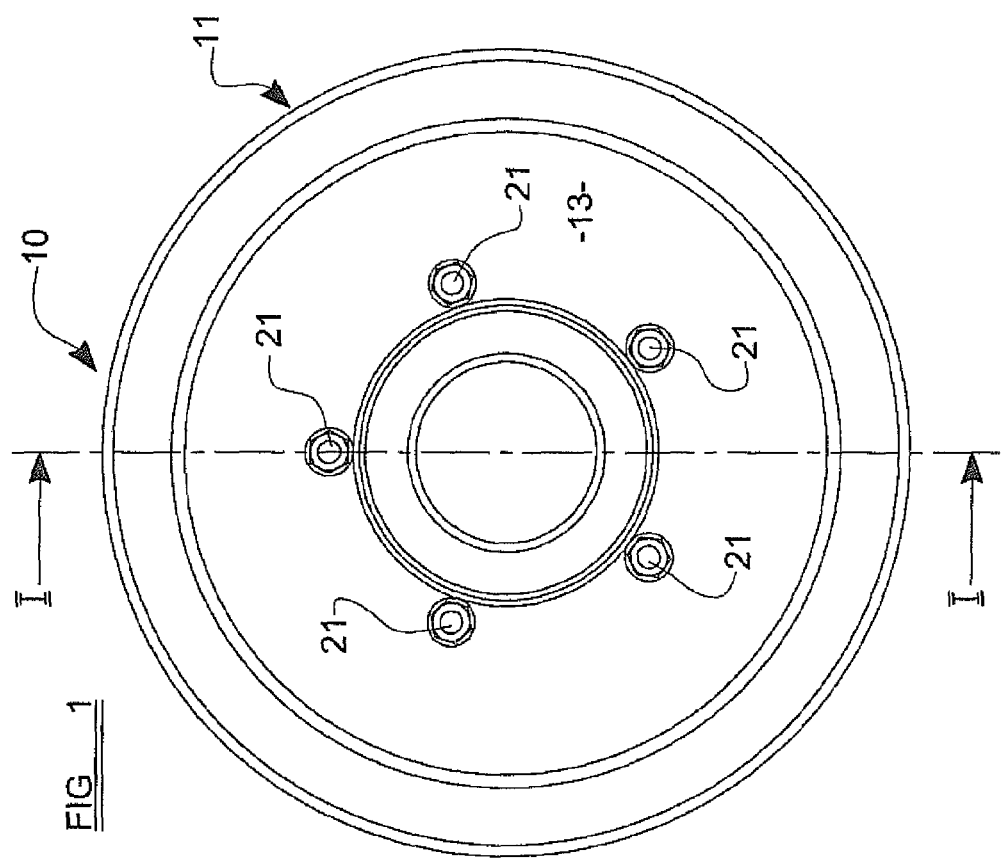

WHEEL CONSTRUCTION

This invention relates to a wheel construction and more particularly but not exclusively to a wheel construction for agricultural vehicles or light construction machines or the like.

BACKGROUND

Wheel constructions for agricultural vehicles and the like off-road vehicles, are known which include a circular wheel rim which provides respective axially inner and outer flanges which each provide a seat for a tyre bead of a floatation tyre which is fitted to a radially outer, or "tyre side" of the rim. In the example of U.S. Pat. No. 5,560,686, such a wheel construction is disclosed which further includes a disc by means of which the wheel is securable to a hub of the vehicle, the disc being connected to a radially inner side of the rim and the disc and rim being separable. This invention is though applicable to wheels in which the rim and disc are permanently connected together e.g. by welding.

In this specification, by "floatation tyre" we mean a wide (axially long) tyre which spreads loads thus reducing, e.g. soil, compaction, when the vehicle is driven on a non-road surface.

Agricultural vehicle wheel constructions are known which include a wheel rim with axially inner and outer portions which each provide a tyre bead seat flange, and an adjoining frusto-conical connecting surface which extends axially towards the mid-portion where there is central well. The tyre bead seat flange, and typically at least a part of the connecting surface, together provide a seat for the tyre. The connecting surface adjoins a circumferentially extending side part, which side part extends to and adjoins the mid-portion of the rim.

It has been found that with such existing rims, the service life of the rims may be insufficient because structural stresses which occur in the area where the side parts adjoin the mid-region, can lead to premature failures of the rims.

SUMMARY

According to one aspect of the present invention we provide a wheel construction.

The present invention enables the structural stresses which occur in the area where the side part of the at least one of the inner and outer portions adjoins the mid-region to be decreased, and this has been found to lead to structural failures in this area to be at least reduced. This enables the service life of the rim to be increased compared with prior proposals, and moreover, the thickness of the rim material can be reduced without compromising the structural integrity of the rim, thus reducing weight and the cost of production.

In a preferred embodiment the first concave surface of the curved region is located radially outwardly of the second concave surface and the third concave surface is located radially inwardly of the second concave surface, the third concave surface continuously adjoining the mid-region and the first concave surface continuously adjoining the frusto-conical region.

Between the first and second concave surfaces there may be a convex formation, and between the second and third concave surfaces there may be a further convex formation, all when viewed from the tyre side of the rim. The convex formation between the first and second concave surfaces preferably continuously melds with the adjacent first and second concave surfaces, and the further convex formation between the second and third concave surfaces may continuously meld with the adjacent second and third concave surfaces. Thus a continuously undulating curved region is provided.

The second and third concave surfaces and the further convex formation between the second and third curved surfaces may each have a local respectively internal and external radius of between 6 mm and 14 mm, and preferably of about 10 mm.

The first concave surface, and the convex formation between the first and second concave surfaces may each have a local respectively internal and external radius of between 8 mm and 16 mm, and preferably of about 12 mm.

The frusto-conical region of the side part may subtend an angle of between 15° and 50°, preferably an angle of about 36° to a plane which is perpendicular to the wheel axis.

Preferably the wheel rim is symmetrical about a central plane of the mid-region which is perpendicular to the wheel axis.

The external local radius at the radiussed surface where the frusto-conical region of the side part and the connecting surface continuously meld may be between 5.5 mm and 13 mm.

The frusto-conical connecting surface of the at least one of the inner and outer portions may subtend an angle to a plane which is perpendicular to the wheel axis, of greater than 75° and preferably in the order of 85° or even 95°.

To add rigidity to the construction, if desired the flange of the at least one of the inner and outer portions may extend radially outwardly of the end of maximum radius of the frusto-conical connecting surface to a curved flange surface where the radius of the respective radially inner or outer portion is a maximum, by a distance of at least 12 mm. A termination position of the flange may be located more than two-thirds of the distance between the end of maximum radius of the frusto-conical connecting surface and the curved flange surface.

BRIEF DESCRIPTION OF THE DRAWINGS

Embodiments of the invention will now be described with reference to the accompanying drawings in which:

FIG. 1 is an illustrative axial end view of a wheel for an agricultural or light construction vehicle, in accordance with the present invention;

FIG. 2 is a cutaway perspective view on I-I of FIG. 1 of part of the wheel, showing the general wheel construction;

DETAILED DESCRIPTION

Figure 3:
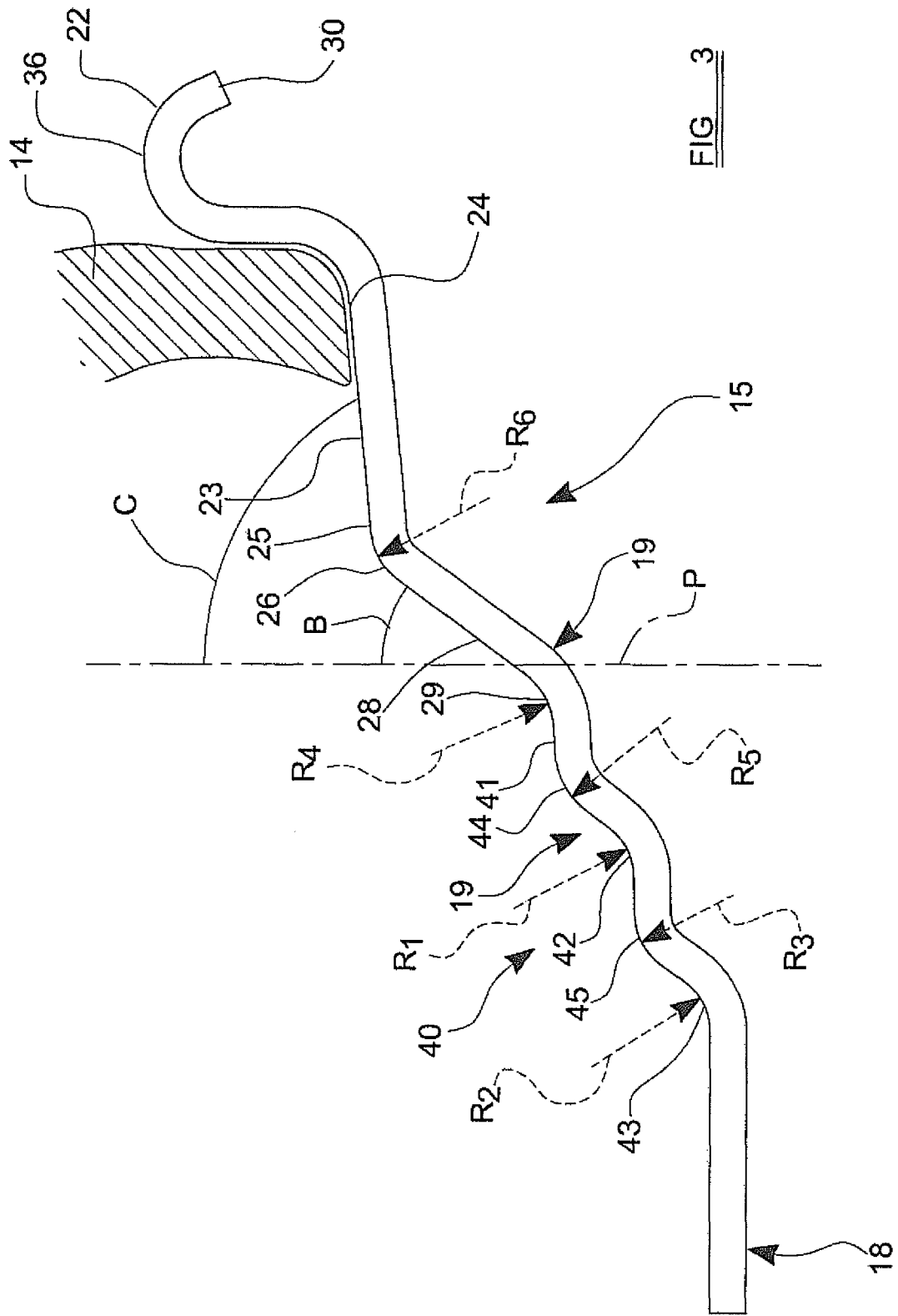
FIG. 3 is a detailed sectional view of an axially outer portion of a wheel construction in accordance with the present invention, enlarged for clarity.

Referring to FIGS. 1 and 2 there is shown a wheel construction 10 which includes a wheel rim 11 which in use, at a tyre side 12 of the rim 11 receives a tyre 14. The position of the tyre 14 is indicated only in FIG. 3.

The rim 11 is circular and in this case is generally symmetrical, having axially inner 16 and axially outer 15 portions, and a mid-portion 18 between the axially inner and outer portions 15, 16.

Each axially inner and outer portion 16, 15 provides a flange 22, a frusto-conical connecting surface 23, and side parts 19, 20 between the mid portion 18 and each respective connecting surface 23.

Each flange 22 and an adjacent part of the connecting surface 23 in use, provide a seat for a bead of the tyre 14. The rim 11 has secured, releasably or permanently, at the inner radial side opposite the tyre receiving side 12, a disc 13 by means of which the wheel 10 is mountable on a hub 17, by means of a plurality of fasteners 21. In use, the wheel 10 rotates with the hub 17 about a wheel axis A.

It has been found that with prior art proposals, as the wheel rim 11 is formed, typically by a cold forming or pressing operation, the areas where the side parts 19, 20 adjoin the mid-portion 18 are formed with structural stresses which can lead to premature failure of the wheel rim 11 in this area. Also, with some prior proposals, the flanges 22 at the axial ends of the wheel construction 10 which provide the tyre 14 bead seats, have been found to be insufficiently substantial.

The configuration of the axially outermost portion 15 of the rim 11 i.e. the portion of the rim 11 which is use is axially outermost of the vehicle on which the wheel 10 of the invention is mounted, will now be described in detail, with additional reference to FIG. 3.

The generally frusto-conical connecting surface 23 has an axial end 24 of greatest radius and an axial end 25 of least radius, the connecting surface 23, at its axial end 24 of greatest radius, adjoins the flange 22, and the connecting surface 23 extends radially inwardly of the rim 11 towards the mid-portion 18. The axial end 25 of the frusto-conical connecting surface 23 of least radius adjoins, by a circumferentially extending radiussed surface 26, the adjacent side part 19.

In another embodiment, if desired, instead of the radiussed surface 26, the connecting surface 23 and the side part 19 may be adjoined by a convex hump which may extend radially outwardly of the wheel axis A beyond the end 25 of least radius of the adjoining frusto-conical connecting surface 23.

The mid-portion 18 includes a circumferential well where the radius of the wheel rim 11 is a minimum.

Referring now to FIG. 3 the side part 19 includes both a frusto-conical region 28 and a curved region 40. By providing the side part 19 particularly the curved region 40, in accordance with the invention, the stresses present in the area between the frusto-conical region 28 and the mid region 18 are avoided during manufacture thus improving the service life of the wheel 10.

The frusto-conical region 28 subtends an angle B of about 36° to a plane P which extends perpendicularly to the wheel axis A but the frusto-conical region 28 may in other examples, typically subtend an angle of between 15° and 50°.

The curved region 40 adjoins an end 29 of least radius of the frusto-conical region 28 of the side part 19. The curved region 40 is provided by a first circumferentially extending concave surface 41, and a second circumferentially extending concave surface 42 and a third circumferentially extending concave surface 43, (all when viewed from the tyre side 12 of the rim 11). The first and second concave surfaces 41, 42 are axially separated in this example, by a convex formation 44 and the second and third concave surfaces 42, 43 are axially separated by a further convex formation 45 (all when viewed from the tyre side 12 of the rim 11).

In this example, the first concave surface 41 of the curved region 40 is located radially outwardly (relative to the wheel axis A) of the second and third concave surface, 42, 43 and the third concave surface 43 is located radially inwardly of the first and second concave surfaces 41, 42 so that the second concave surface 42 is between the first and third concave surfaces 41, 43. The third concave surface 43 continuously adjoins the mid-region 18.

The convex formation 44 between the first and second concave surfaces 41, 42 continuously melds with the adjacent first and second concave surfaces 41, 42 and the further convex formation 45 continuous melds with the adjustment second and third convex surfaces 42, 43 so that the curved region 40 is continuously undulating, although if desired, there may be a frusto-conical or cylindrical region between the convex formation 44 and one or other of the concave surfaces 41, 42, and/or between the further convex formation 45 and one or other of the second and third concave surfaces 42, 43.

Through this specification, by "local" radius we mean the actual radius of the surface rather than the radial distance of the surface from the wheel axis.

In the example of FIG. 3, the second and third concave surfaces 42, 43 and the further convex formation 45 between them, each are of a local respective internal and external radius R1, R2, R3, of about 10 mm, but in any event preferably of between 6 mm and 14 mm. The radii R1, R2, R3 need not all be the same, as in the example, but at least one of the second and third concave surfaces 42, 43 may have a local radius different to the other or to the further convex formation 45 as desired.

Further, in the example of FIG. 3, the first concave surface 41 and the convex surface 44 between the first and second concave surfaces 41, 42 are of a local respective internal and external radius R4, R5 respectively, of about 12 mm, but in any event of preferably between 8 mm and 16 mm. The radii R4 and R5 need not be the same, as in the example.

In another example, all of the radii R1, R2, R3, R4 and R5 of the curved surfaces of the curved region 40 of the side part 19, may all be the same, or may all be different, or any or some of them may be the same.

The radiussed surface 26 of the outer portion 15 of the rim 11 in the example, may have a local radius R6 of between 5.5 mm and 13.5 mm and desirably of about 9.5 mm.

The frusto-conical connecting surface 23 of the outer portion 15 may subtend an angle C to the plane P which is perpendicular to the wheel axis A, of greater than 75°, e.g. 85° or 95° as in the example shown so that the cone angle of the frusto-conical connecting surface 23 may be about 10°.

In the wheel construction 10 of the example the flanges 22 of the inner and outer portions 15, 16 each terminate at a respective position 30 outwardly radially relative to the wheel axis A of the frusto-conical connecting surface 23. The flange 22 extends radially outwardly of the end 24 of maximum radius of the frusto-conical connecting surface 23 to a curved flange surface 36 where the wheel rim 11 is of maximum radius, of a distance of at least 12 mm and the termination positions 30 of the flanges are preferably located not more than two-thirds of the distance between the end 24 of maximum radius of the frusto-conical connecting surface 23 and the curved flange surface 36, Thus the flanges 22 are more substantial than in prior art proposal and add additional stiffness at the axial ends of the rim 11, as well as adding stiffness to the rim 11 generally. In the example, the convex curved flange surface 36 of each flange 22, when viewed from the tyre side 12 of the rim 11, has a local radius of about 12.7 mm, and where the flange 22 adjoins the end 24 of maximum radius of the frusto-conical connecting surface 23, there is a local internal radius R7 in the order of 8 mm.

By adopting the present invention, a rim 11 is provided in which the material thickness of the rim 11 can be reduced compared with comparable rims which do not incorporate the invention.

Various modifications are possible without departing from the scope of the invention.

In the example shown in the FIGS. 1, 2 and 4, the rim 11 is symmetrical about a central plane of the mid region 18 which is perpendicular to the wheel axis A and coincident with line I-I in FIG. 1. In another example the wheel 10 may be asymmetrical and only one of the side parts 19, 20 of the wheel 10 may have the profile of the invention.

Although the wheel construction described is that of a floatation wheel for use on an agricultural vehicle such as a tractor, or a light construction vehicle such as an excavating and/or loading machine, the invention may be applied to another wheel construction.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A wheel construction which includes a wheel rim-which in use, at a tire side of the rim, receives a tire, the rim being circular and having axially inner and outer portions, and a mid-portion between the axially inner and outer portions, the mid-portion including a circumferential well where the radius of the wheel rim is a minimum, and each axially inner and outer portion providing a flange, a connecting surface adjoining the flange and extending axially towards the mid portion, the flange and a part of the connecting surface providing a seat for a bead of the tire, and there being a side part between the connecting surface and the mid portion and wherein for at least one of the inner and outer portions, the connecting surface is frusto-conical having an axial end of greatest radius and an axial end of least radius axial end of greatest radius of the connecting surface adjoining the flange, and the side part of the at least one of the axially inner and outer portions including a generally frusto-conical region and a curved region, the frusto-conical region of the side part having an end of greatest radius and an end of least radius, the end of greatest radius of the frusto-conical region of the side part adjoining the connecting surface, and the curved region of the side part including first, second and third axially spaced circumferentially extending concave surfaces, when viewed from the tire side of the rim, the curved region adjoining the end of least radius of the frusto-conical region of the side part and the mid-portion, said frusto-conical region having a surface which is non-parallel to the connecting surface.

2. A construction according to claim 1 wherein the first concave surface of the curved region is located radially outwardly of the second concave surface and the third concave surface is located radially inwardly of the second concave surface, the third concave surface continuously adjoining the mid-region and the first concave surface continuously adjoining the frusto-conical region.

3. A construction according to claim 1 wherein between the first and second concave surfaces there is a convex formation, and between the second and third concave surfaces there is a further convex formation, all when viewed from the tire side of the rim, the convex formation between the first and second concave surfaces continuously melding with the adjacent first and second concave surfaces and the further convex formation between the second and third concave surfaces continuously melding with the adjacent second and third concave surfaces to provide a continuously undulating curved region.

4. A construction according to claim 1 wherein the second and third concave surfaces, and a convex formation between the second and third curved surfaces, are each of a local internal and external radius (R1,R2,R3) of between 6 mm and 14 mm.

5. A construction according to claim 1 wherein the first concave surface, and a convex formation between the first and second concave surfaces are each of a local internal and external radius of between 8 mm.

6. A construction according to claim 1 wherein the frusto-conical region of the side part subtends an angle of between 15° and 50° to a plane (P) which is perpendicular to the wheel axis.

7. A construction according to claim 1 wherein the wheel rim is symmetrical about a central plane (I-I) of the mid-portion which is perpendicular to the wheel axis (A).

8. A construction according to claim 1 wherein an external local radius (R6) of a radiussed surface where the frusto-conical region of the side part and the connecting surface continuously meld, is between 5.5 mm and 13 mm.

9. A construction according to claim 1 wherein the frusto-conical connecting surface of the at least one of the inner and outer portions subtends an angle to a plane which is perpendicular to the wheel axis (A), of greater than 75°.

10. A construction according to claim 1 wherein the flange of the at least one of the inner and outer portions extends radially outwardly of the end of maximum radius of the frusto-conical connecting surface to a curved flange surface where the radius of the respective radially inner or outer portion is a maximum, by a distance of at least 12 mm.

11. A construction according to claim 10 wherein a termination position of the flange is located more than two-thirds of a distance between the end of maximum radius of the frusto-conical connecting surface and the curved flange surface.

12. A construction according to claim 4 wherein the second and third concave surfaces and a convex formation are each of a local internal and external radius of about 10 mm.

13. A construction according to claim 5 wherein the first concave surface and the convex formation between the first and second concave surfaces are each of a local internal and external radius of about 12 mm.

14. A construction according to claim 6 wherein the frusto-conical region of the side part subtends an angle of about 36° to the plane (P).

15. A construction according to claim 9 wherein the frusto-conical connecting surface of the at least one of the inner and outer portions subtends an angle in the order of 95° to a plane which is perpendicular to the wheel axis (A).

16. A wheel construction comprising:
a wheel rim arranged to receive a tire, the wheel rim being circular and having an axially inner portion, an axially outer portion, and a mid-portion disposed between the axially inner portion and the axially outer portion, the mid-portion including a circumferential well forming a minimum radius of the wheel rim;
each of the axially inner portion and the axially outer portion including a flange and a connecting surface adjoining each flange and extending axially towards the mid-portion, a portion of each flange and the adjoining connecting surface providing a bead seat for the tire;
each of the axially inner portion and the axially outer portion further including a side part between the connecting surface and the mid-portion;
the connecting surface of at least one of the axially inner portion or the axially outer portion being frusto-conical and having a first end portion having a first radius and a second end portion having a second radius less than the first radius, the first end portion adjoining the flange;
the side part of the at least one of the axially inner portion or the axially outer portion including a generally frusto-conical region and a curved region;
the frusto-conical region having a first end of greater radius adjoining the second end of the connecting surface and an end of lesser radius adjoining the mid-portion, said frusto-conical region having a surface which is non-parallel to the connecting surface; and the curved region including a plurality of axially spaced and circumferentially extending concave surfaces viewed from a tire side of the wheel rim, a first one of the concave surfaces adjoining the end of lesser radius of the frusto-conical region of the side part to the curved region of the side part.

* * * * *